United States Patent [19]
Smith et al.

[11] Patent Number: 4,838,295
[45] Date of Patent: Jun. 13, 1989

[54] SYSTEM FOR CONTROLLING MASS FLOW RATES OF TWO GASES

[75] Inventors: David H. Smith, Mercer Island; Kenneth E. Miller, Edmonds, both of Wash.

[73] Assignee: AirSensors, Inc., Seattle, Wash.

[21] Appl. No.: 897,541

[22] Filed: Aug. 21, 1986

[51] Int. Cl.$^4$ .......................................... G05D 11/13
[52] U.S. Cl. ................................... 137/9; 137/101.19
[58] Field of Search ..................... 137/6, 101.19, 3, 9; 123/527; 73/861.02, 861.03, 861.04, 196, 204

[56] References Cited

U.S. PATENT DOCUMENTS

| | | |
|---|---|---|
| 2,326,205 | 8/1943 | Dowdell . |
| 2,394,297 | 2/1946 | Fayles ............................ 137/101.19 |
| 2,926,684 | 3/1960 | Replogle ........................ 137/101.19 |
| 3,890,995 | 6/1975 | Miller et al. . |
| 3,935,851 | 2/1976 | Wright et al. . |
| 4,125,093 | 11/1978 | Platzer ........................ 137/101.19 X |
| 4,253,428 | 3/1981 | Billings et al. . |
| 4,277,254 | 7/1981 | Hanson ........................ 137/101.19 X |
| 4,280,968 | 7/1981 | Smeets . |
| 4,335,697 | 6/1982 | McLean . |
| 4,411,234 | 10/1983 | Middleton . |
| 4,523,461 | 6/1985 | Watkins ............................... 73/204 |
| 4,537,172 | 8/1985 | Kanehara et al. . |

FOREIGN PATENT DOCUMENTS

| | | |
|---|---|---|
| 0071588 | 2/1983 | European Pat. Off. . |
| 57-18446 | 1/1982 | Japan . |
| 61-49159 | 3/1986 | Japan . |

Primary Examiner—Stephen Hepperle
Attorney, Agent, or Firm—Seed and Berry

[57] ABSTRACT

A control system for internal combustion engines, including a first conduit for the flow of intake air, and a second conduit for the flow of natural gas to be mixed with the air for combustion. The flow of the air is variable over a range of mass flow rates during operation of the engine and an air mass sensor is positioned to sense the mass flow rate in the first conduit and generate a first flow rate signal indicating the mass flow rate. A natural gas mass sensor is positioned to sense the mass flow rate of the gas in the second conduit and to generate a second flow rate signal indicating the mass flow rate of the natural gas. The first and second flow rate signals are compared in an electronic controller that generates a control signal if the first and second flow rates vary from a predetermined ratio. The ratio is selected to provide a substantially stoichiometric ratio of air and natural gas. A valve is provided to adjustably control the flow rate of the natural gas in response to the control signal to maintain the preselected ratio. A sensor and shutoff valve are also provided for terminating the flow of the natural gas when its pressure falls below a predetermined pressure, allowing immediate flow of gasoline to the engine, thus assuring smooth, continued operation of the vehicle. A throttle body has a natural gas distribution ring in the throat of the body and provides a curtain flow of gas.

2 Claims, 3 Drawing Sheets

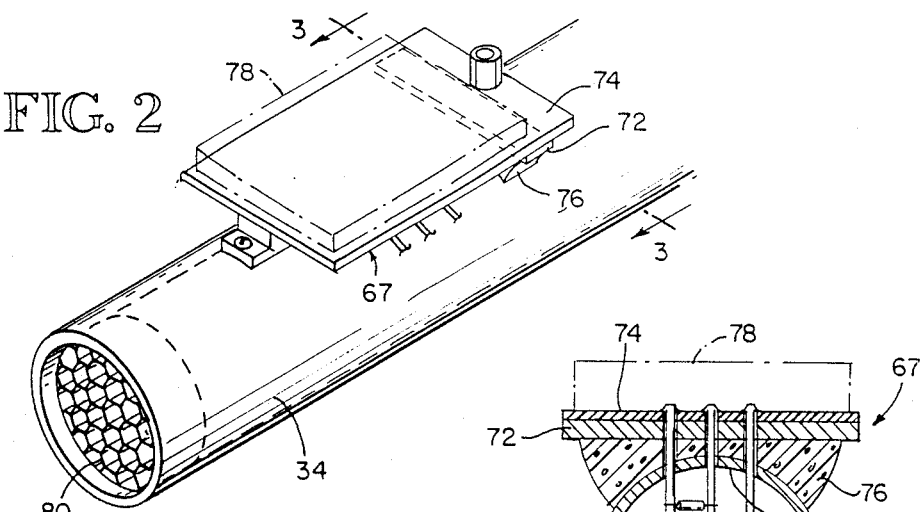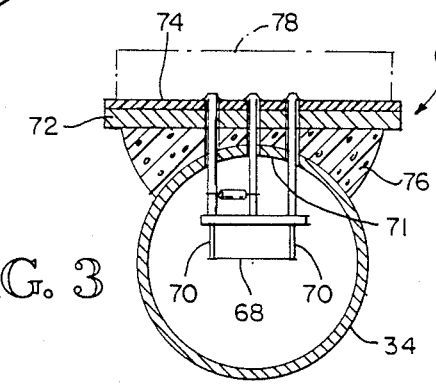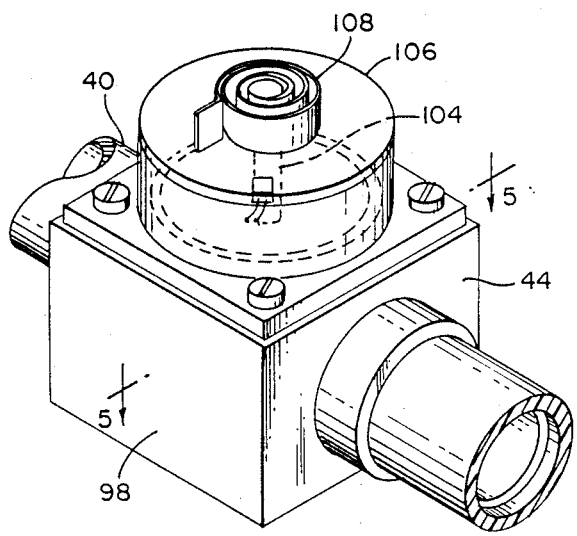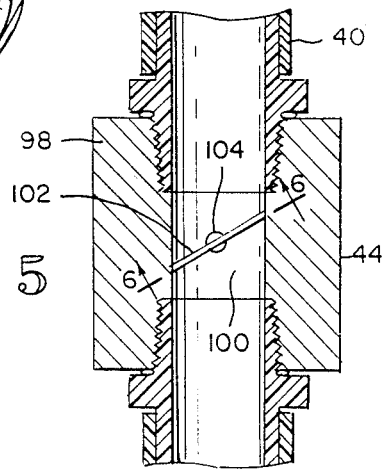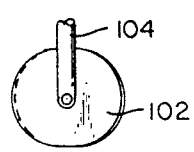

SYSTEM FOR CONTROLLING MASS FLOW RATES OF TWO GASES

DESCRIPTION

1. Technical Field

The present invention relates to a system for controlling the mass flow rates of two gases.

2. Background of the Invention

In many situations, there is a need to control the mass flow ratio of two gases to maintain them in a predetermined ratio. This need arises in operation of gaseous fuel internal combustion engines, boilers and other industrial applications. There are other situations in which control of two gases is necessary, such as ventilating greenhouses, in which it is desired to have a certain mixture of air and carbon dioxide. For internal combustion engines, such as automobile engines operating on natural gas, a stoichiometric ratio of the gaseous fuel and air is desirable. Furthermore, it is desirable to achieve accurate control of the flow to provide the predetermined ratio by a method which is not subject to error associated with pressure and temperature variations.

With an automobile internal combustion engine which is operating on natural gas, the speed at which the engine is operating establishes an air flow into the engine for purposes of combustion. Similarly, the operating point of a boiler is determined by the blower used as the source of combustion air. Since in these applications the flow of air to the engine or boiler is relatively fixed for any particular operating condition of the engine, but varies significantly as the operating condition changes, it becomes necessary to regulate the flow of gaseous fuel to obtain optimum performance.

It will therefore be appreciated that there has been a significant need for a control system which suitably regulates the mass flow rates of two gases to maintain them in a predetermined ratio. For internal combustion engines, boilers and the like, the flow rate of gaseous fuel must be responsive to the flow rate of the combustion air. The system should be relatively accurate and reliable, and should allow optimum performance of the engine or boiler, yet be inexpensive to manufacture.

When used as a control system for a vehicle internal combustion engine where the engine is convertible during operation between natural gas and liquid gasoline as alternative sources of power, the control system should provide means for a quick changeover from natural gas to gasoline operation when the pressure of the natural gas falls below a predetermined level. In the past, vehicles set up to operate alternatively on both sources of fuel have experienced problems when switching from gasoline to natural gas. The supply of gasoline in the float bowl had to be exhausted before the switch to natural gas could be made so that the engine would not be operating on both gasoline and natural gas. When switching from natural gas to gasoline operation, such as when the pressure of the natural gas was insufficient, it was then necessary to terminate the flow of natural gas and wait for the gasoline float bowl to fill up again. This was often accomplished by coasting in gear or turning the starter motor to pump gasoline into the float bowl. When an electric fuel pump was used, the filling of the float bowl would occur automatically, but there was a delay before a supply of gasoline was present to commence operation of the engine on gasoline.

The present invention fulfills these needs and further provides other related advantages.

DISCLOSURE OF THE INVENTION

The present invention resides in a control system for controlling the relative mass flow rates of two gases. The system includes a first conduit for the flow of a first gas, and a first gas mass sensor positioned to sense the mass flow rate of the first gas in the first conduit. The flow of the first gas is variable over a range of mass flow rates, and the first gas mass sensor generates a first flow rate signal indicating the mass flow rate of the first gas. The system also includes a second conduit for the flow of a second gas, and a second gas mass sensor positioned to sense the mass flow rate of the second gas in the second conduit. The flow of the second gas is adjustable over a range of mass flow rates, and the second gas mass sensor generates a second flow rate signal indicating the mass flow rate of the second gas. The system has an electronic controller for comparing the first and second flow rate signals, and generating a control signal if the first and second flow rate signals vary from a predetermined ratio. A valve adjustably controls the flow rate of the second gas in response to the control signal to maintain a predetermined ratio. As such, the flow rate of the second gas is controlled responsive to variations in the flow rate of the first gas to maintain the mass flow rates of the first and second gases in the desired ratio.

In the preferred embodiment of the invention, the first and second conduits have interior flow cross-sectional areas sized relative to each other to approximately correspond to the predetermined ratio of the mass flow rates of the first and second gases. The first and second gas mass sensors have a substantially identical non-linear output response relative to the mass flow being sensed. As such, the output response of the first and second gas mass sensors will be generally scaled by the choice of cross-sectional areas for the first and second conduits. Even with the output response of the first and second gas mass sensors being non-linear, the first and second flow rate signals will remain comparable during operation over a wide range of flow rates without introducing unacceptable error.

The present invention also includes a method for controlling the relative mass flow rates of the two gases.

In one embodiment of the invention, the control system is for an internal combustion engine driven vehicle convertible during operation between liquid gasoline and gaseous fuel as alternative sources of power. The first conduit conducts intake air to the engine and a second conduit conducts gaseous fuel to the engine for mixture with the air. The gaseous fuel is supplied from a pressurized source and a sensor senses the pressure of the gaseous fuel in the source. A shutoff valve is responsive to the sensor for terminating the flow of the gaseous fuel in the second conduit in response to the pressure of the source falling below a predetermined pressure.

Also provided is means for controlling the flow of gasoline into the engine. The control means is responsive to the pressure sensor and allows the immediate flow of gasoline to the engine in response to the pressure of the gaseous fuel in the source falling below the predetermined pressure. As such, when a low gaseous fuel pressure is realized, the control system switches to gasoline operation without delay and while avoiding supplying the engine with a mixture of both gasoline and gaseous fuel.

Other features and advantages of the invention will become apparent in the following detailed description, taken in conjunction with the accompanying drawings.

BRIEF DESCRIPTION OF THE DRAWINGS

FIG. 2 is an isometric view of a flow conduit and a hot wire anemometer mounted thereto of the type used with the present invention.

FIG. 3 is a sectional view taken substantially along lines 3—3 of FIG. 2.

FIG. 4 is an isometric view of a servo valve used with the present invention.

FIG. 5 is a sectional view taken substantially along the lines 5—5 of FIG. 4.

FIG. 6 is a fragmentary sectional view of the butterfly used in the servo valve of FIGS. 4 and 5, taken substantially along the lines 6—6 of FIG. 5.

BEST MODE FOR CARRYING OUT THE INVENTION

Figure 1:
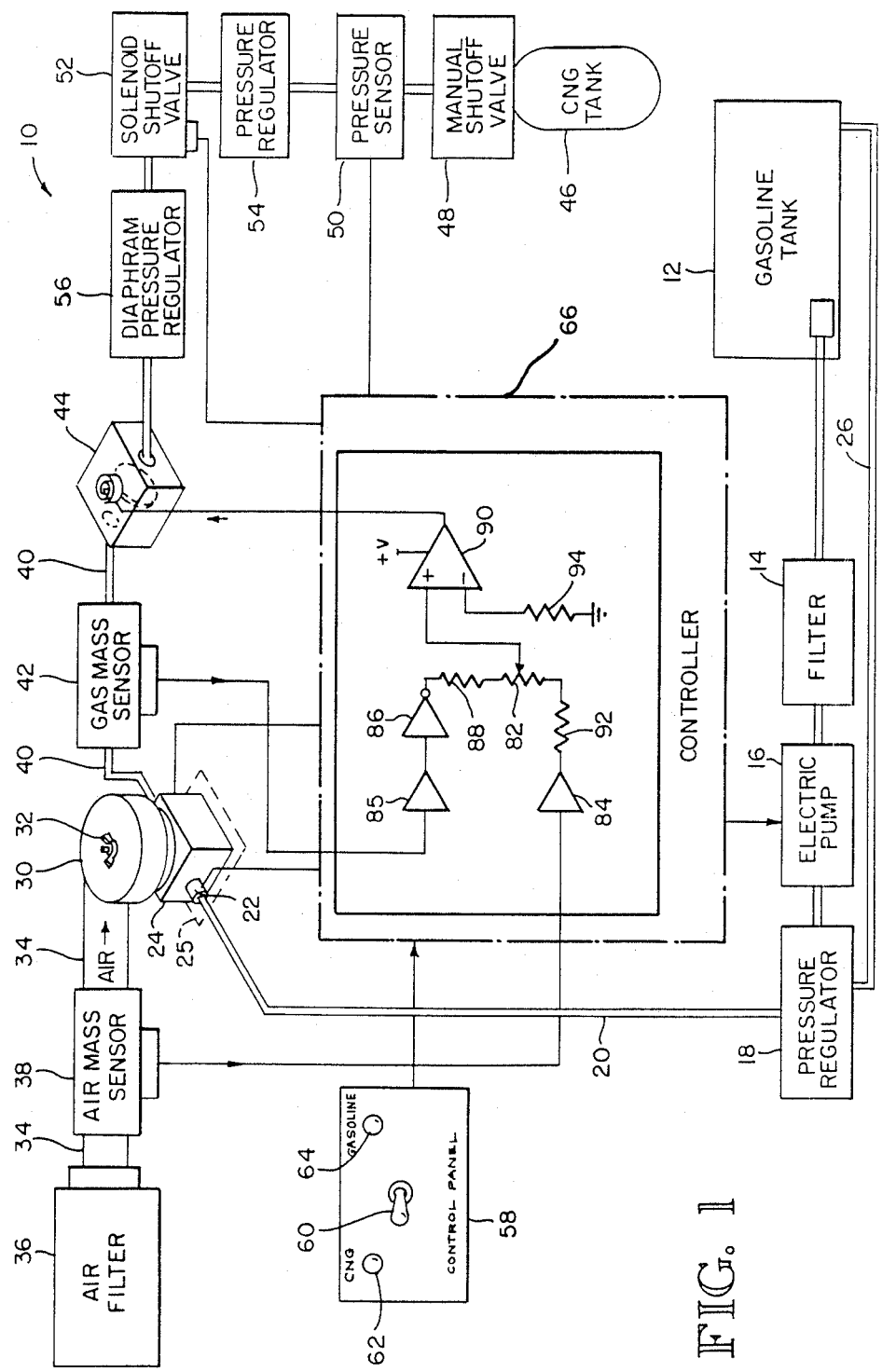
FIG. 1 is a schematic diagram of the control system of the present invention.

As shown in the drawings for purposes of illustration, the present invention is embodied in a control system, indicated generally by reference numeral 10, for controlling the relative mass flow rates of two gases. The invention may be used wherever it is necessary to control the relative mass flow rates of two gases, including ventilation of greenhouses, which require a certain mixture of air and carbon dioxide, and in the operation of gaseous fuel interal combustion engines and boilers. The invention is described herein for uses with an internal combustion engine for a driven vehicle convertible during operation between liquid gas and gaseous fuel, such as natural gas, as alternative sources of power.

The control system 10 is shown schematically in FIG. 1 operating with an engine for an automobile. The automobile includes a conventional tank 12 for liquid gasoline and a gasoline filter 14 through which the gasoline passes to an electric fuel pump 16. A conventional pressure regulator 18 controls the pressure of the gasoline delivered by a fuel line 20 from the pressure regulator to one or more injectors 22. The injector is mounted to inject gasoline into a throttle body 24 which may be mounted on the intake manifold 25 of the engine in place of the original equipment carburetor. The throttle body includes conventional butterfly valves 27A and 27B (See FIG. 7) positioned below the point at which the injector injects fuel into the throttle body. A return fuel line 26 is provided between the pressure regulator 18 and the gasoline tank 12 for diverting excess fuel back to the tank. In the preferred embodiment of the invention, the pressure regulator maintains a gasoline pressure of 40 psi.

Mounted on top of the throttle body 24 is a throttle body cover 30 removably attached to the throttle body by a wing nut and stem arrangement 32. An air conduit 34 communicates ambient air with the throttle body cover 30 to meet the volume of air demanded by the engine during operation for combustion purposes. The air conduit has an air filter 36 mounted at its end which is open to the ambient air and filters any particulate matter from the air flow passing into and through the conduit. An air mass sensor 38 is positioned to sense the mass flow rate of the air in the air conduit 34, and to generate an air flow rate signal indicating the mass flow rate of the air in the conduit.

In much the same manner, a natural gas conduit 40 communicates natural gas to the throttle body cover 30 for mixture with the air in preparation for combustion when the engine is operating on natural gas rather than liquid gasoline.

Figure 7:
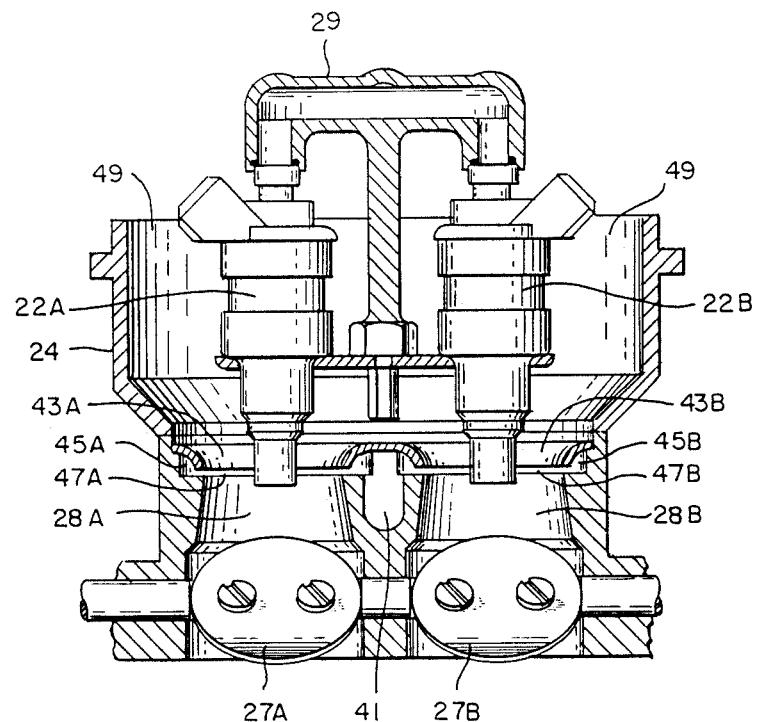
FIG. 7 is a fragmentary sectional view of a throttle body used with the control system of the present invention.

It is important to mix the natural gas completely and in the same proportions for each cylinder of the engine. Mixing is a problem, since air and natural gas have different densities and mixing of the two is inherently difficult. As shown in FIG. 7, mixing of the air and natural gas is accomplished in the throttle body 24 first by splitting of the air and gas flows in the throttle body equally into two flows through the throttle body throats 28A and 28B. The natural gas conduit 40 communicates with a central throttle body cavity 41 from which the gas is distributed evenly about the perimeter of the two throttle body throats using distribution rings 43A and 43B positioned in the throttle body throats 28A and 28B, respectively, at the venturi point for the throat and above the butterfly valve 27A and 27B for the throat. The distribution rings have the shape of a one-quarter toroid and define circumferential distribution chambers 45A and 45B through which the natural gas flows from the central chamber 41 to a circumerential slot 47A and 47B defined by the space between the edge of the distribution ring and a corresponding edge of the throttle body wall. These slots 47A and 47B extend circumferentially about the throttle body throats 28A and 28B, respectively, and distribute the natural gas equally around the throats and form a curtain flow downward in the throats. Due to the positioning of the distribution ring at the venturi point, the pressure in each of the distribution chambers 45A and 45B is dependent upon the vacuum in the throats, with both being proportional to the flow of air through the throats. As such, a very even flow in curtain form which is proportional to the air flow through the throats is provided. When the curtain flow reaches the area of the throat with the butterfly valves 27A and 27B, the high turbulence encountered there causes the natural gas and air to completely mix, avoiding previously encountered difficulties in achieving mixing of the different density air and natural gas. The described mixing system is adaptable to different engine sizes, requiring between one and four throttle body throats, by providing a distribution ring and venturi-slot in each throat.

As previously described, the throttle body 24 has the throttle body cover 30 positioned atop the body and the air conduit 34 communicates with the throttle body cover. As shown in FIG. 7, the air enters the throttle body from above through a circumferential passageway 49, which communicates the air with the central opening of the distribution rings 43A and 43B. For operation on liquid gasoline, the throttle body shown in FIG. 7 is provided with two injectors 22A and 22B which are fed by a gasoline manifold 29 connected to the fuel line 20. The injectors extend downward through the central opening in the natural gas distribution rings 43A and 43B and inject the gasoline directly into the throttle body throats 28A and 28B above the butterfly valves 27A and 27B.

A natural gas mass sensor 42 is positioned to sense the mass flow rate of the natural gas in the gas conduit 40, and to generate a gas flow rate signal indicating the mass flow rate of the natural gas in the conduit. As will be described in more detail below, the air flow rate signal and the gas flow rate signal are used to control operation of a servo valve 44 which controls the flow of natural gas to the gas conduit 40.

The natural gas is supplied to the servo valve 44 in a conventional manner from a pressurized storage tank 46. A manual shutoff valve 48 is provided for the tank. Piping communicates the natural gas to a pressure sensor 50 which operates in conjunction with a solenoid shutoff valve 52 to cut off the flow of natural gas to the throttle body 24 if the line pressure falls below a predetermined level indicative of insufficient pressure to operate the engine on natural gas. Positioned in the flow of natural gas between the pressure sensor and the solenoid shutoff valve is a pressure regulator 54 to regulate line pressure. The natural gas is piped from the solenoid shutoff valve through a diaphragm pressure regulator 56 and then to the input of the servo valve 44. As previously noted, the output of the servo valve supplies the natural gas to the gas conduit 40.

A control panel 58 is provided with a toggle switch 60 to allow an operator to manually select between operation on natural gas or liquid gasoline as alternative fuels. An indicator lamp 62 is provided to indicate when the vehicle is being operated on natural gas, and an indicator lamp 64 is provided to indicate when the engine is operating on gasoline. The control system 10 of the present invention further includes an electronic controller 66, indicated by the phantom line box in FIG. 1. The controller receives signals from the pressure sensor 50 and in response thereto sends control signals to the solenoid shutoff valve 52. The controller also operates in conjunction with the control panel 58 to select the mode of operation. As will be described below, the controller controls operation of the servo valve 44.

When the control system 10 of the present application is used to control gases for purposes of combustion, it is desirable to provide a stoichiometric ratio of air and gaseous fuel such as natural gas. To achieve an accurate flow rate of the gases, it is desirable to measure the mass flow rate by a method which is not subject to errors associated with pressure and temperature variation. With the present invention, this is accomplished by measuring the mass flow rate of the gases utilizing hot wire anemometers 67 of the type shown in FIGS. 2 and 3. An anemometer of this type is described in U.S. Pat. No. 4,523,461, which is incorporated by reference herein. By sensing mass flow, the measurement is not sensitive to normal pressure and temperature variations.

The anemometer 67 includes a straight length of temperature dependent resistive wire 68 extending between a pair of electrically conductive posts 70. An end portion of the posts between which the resistive wire extends is positioned within the conduit through which the air or gas being sensed passes. For purposes of illustration, the conduit will be described in FIGS. 2 and 3 as the air conduit 34; however, the arrangement is the same for the gas conduit 40 except for size, as will be explained below.

The opposite end portion of the posts extend through an opening 71 in the conduit wall and are rigidly supported by a support member 72. A circuit board 74 holds at least a portion of the anemometer electronic circuitry and is electrically connected to the posts. The circuit board is attached to the support member, and both are rigidly mounted on the exterior of the conduit.

A block of closed-cell foam 76 is positioned over the opening 71 and held in place between the circuit board 74 and support member 72 and the conduit 34 to prevent any air from exiting or entering the conduit through the opening around the posts. The block is compressed to seal the opening, but is provided with cuts to receive the posts. A cover 78, shown in phantom, is provided to cover the electronic circuitry mounted on the circuit board. Upstream from the hot wire anemometer 67 is positioned within the conduit a honeycomb arrangement of elongated cells 80 which assist in providing laminar flow of the air in the conduit at the resistive wire 68 of the anemometer.

In a conventional manner, the resistive wire 68 is one branch in a bridge circuit of the anemometer, and the electrical signal or voltage measured across the resistive wire generates an electrical output signal from the anemometer bridge which bears a specific and predictable, but non-linear, relationship to the mass flow of gas or air through the conduit with which the anemometer is operating. The output signal is dependent upon the molecular weight of the gas or air being sensed.

The output signal of the air mass sensor 38 and the output bridge signal of the gas mass sensor 42, after appropriate amplification, are supplied to the controller 66. The output signal of the air mass sensor is dependent upon the air mass flow rate established by the particular air intake of the internal combustion engine for the speed at which it is operating, or when used with other types of combustion, by the combustion air source. With a boiler, the air blower would determine the air mass flow rate. Of course, as the speed of the engine or the blower varies, the mass flow rate of the air varies. In the case of an internal combustion engine, the amount of air sucked in by the engine varies significantly between idle and high power operation.

In view of this, it is desirable to regulate the flow of the gaseous fuel, such as natural gas, to achieve a stoichiometric ratio of gaseous fuel to air in order to achieve optimum performance. Furthermore, this ratio should be maintained substantially constant over the full operating range of the engine, thus requiring the gas mass flow rate of the gaseous fuel to be varied depending upon sensed changes in the air mass flow rate.

This is achieved by the controller 66. As shown in FIG. 1, the output signal of the gas mass sensor 42 is connected to a signal conditioner 85. The output of the signal conditioner 85 is connected to the input of an inverting amplifier 86. The output of the inverting amplifier 86 is connected to a variable resistor 82 through a resistor 88. In the same manner, the output of air mass sensor 38 is also connected to the variable resistor 82 through signal conditioner 84 and resistor 92. The wiper arm of the variable resistor 82 is connected to the noninverting input of an operation amplifier 90. The variable resistor 82 allows for periodic fine tuning mixture adjustment which can be done manually during normal maintenance. The inverting terminal of the operational amplifier 90 is conencted to ground through a resistor 94.

Effectively, the output signal of the air mass sensor 38 and the inverted output signal of the gas mass sensor 42 are summed at the non-inverting terminal of the operational amplifier 90, and the summation is compared to the signal on the inverting terminal.

The output of the operational amplifier 90 is connected to the servo valve 44 and provides a signal to adjustably control the electrically activated servo valve and thereby the flow rate of natural gas to the natural gas conduit 40 to maintain the desired stoichiometric ratio of air and natural gas. As previously noted, the volume or flow of gas allowed by the servo valve is dependent upon the air mass flow for the speed at which the engine is operating. With an automotive engine, the air mass flow typically varies from a low of 40 pounds per hour at idle to a high of 1,700 pounds per hour at high speed operation. The controller 66 provides a means for controlling the flow rate of the natural gas in response to these variations in air flow rate.

Natural gas is much less dense than air, and it is desirable to maintain a 17-to-1 ratio of air to natural gas for stoichiometric operation. In other words, it is desirable when the engine only requires 170 pounds per hour of air to provide 10 pounds per hour of natural gas, and when the engine requires 1700 pounds per hour of air to provide 100 pounds per hour of natural gas. The particular ratio desired is preferably the one which produces a mix of air and natural gas that provides the desired operating power.

It is also desirable to utilize identical hot wire anemometers for the air mass sensor 38 and the gas mass sensor 42. Unfortunately, as previously noted, the output signal from a hot wire anemometer bars a non-linear relationship to the mass flow being measured. As such, the two mass sensors will be operating at different points along their output response curves since the mass flow rates vary by about 17-to-1. Also, changes in the air output signal if used directly will not produce proportional changes to the gas mass flow. This presents a problem when the output signals of the air mass sensor and gas mass sensor are being compared by the controller 66. For example, the proportional changes in the air mass and gas mass flows needed to maintain the predetermined flow ratio will not produce correspondingly proportional changes in the output signals of the air mass and gas mass sensors due to their non-linear response characteristics. One solution is to linearize the output signals of the sensors. In the present embodiment of the invention, the electronic controller 66 provides the means for linearizing the output signals of both anemometers, thus allowing the two signals to be accurately compared and a precise ratio of the two gases to be maintained.

One embodiment of the servo valve 44 which is usable with the present invention is shown in FIGS. 4 and 5. The servo valve has a body 98 with an interior passageway 100. In the passageway is positioned a butterfly valve 102 mounted on a rotatable stem 104. The stem extends through the body and is connected to a permanent magnet linear servo motor 106 of conventional design mounted on top of the valve body. The operational amplifier 90 provides the drive to the servo motor to rotate the valve stem 104 and change the position of the butterfly 102 within the body to increase or decrease the flow of natural gas therethrough. A return spring 108 has one end fixed to the case of the servo motor and the other end attached to the valve stem for rotation of the valve stem to bias and return the butterfly to the closed position when the servo motor is deactivated.

It will be appreciated that, although specific embodiments of the invention have been described herein for purposes of illustration, various modifications may be made without departing from the spirit and scope of the invention. Accordingly, the invention is not limited except by the appended claims.

I claim:

1. A contol system for controlling the relative mass flow rates of two gases without appreciably altering the temperature of the gases, comprising:

a first conduit for the flow of a first gas comprising air, the flow being variable over a range of mass flow rates;

a first hot wire anemometer having a hot wire operating at a substantially constant temperature or current without appreciably altering the temperature of said first gas and being substantially insensitive to pressure and temperature variations of said first gas, said first hot wire anemometer being positioned to directly sense the mass flow rate of said first gas in said first conduit when in a gaseous state, and to generate a first flow rate signal indicating the mass flow rate of said first gas;

a second conduit for the flow of a second gas comprising a combustible fuel in a gaseous state, said second gas differing in composition from said first gas, the flow being adjustable over a range of mass flow rates;

a second hot wire anemometer having a hot wire operating at a substantially constant temperature without appreciably altering the temperature of said second gas and being substantially insensitive to pressure and temperature variations of said second gas, said second hot wire anemometer being positioned to directly sense the mass flow rate of said second gas in said second conduit when in a gaseous state, and to generate a second flow rate signal indicating the mass flow rate of said second gas, said first and second hot wire anemometers having a substantially identical nonlinear output characteristic relative to the mass flow being sensed;

an electronic controller for comparing said first and second flow rate signals, and generating a control signal if said first and second flow rate signals vary from a predetermined ratio, said first and second conduits having interior flow cross-sectional areas sized relative to each other to correspond approximately to said predetermined ratio of the mass flow rates of said first and second gases, whereby the output characteristic of said first and second hot wire anemometers will be generally scaled by the choice of cross-sectional areas for said first and second conduits such that both said first and second hot wire anemometers operate in substantially the same region of their nonlinear output characteristic curve, and even though the output characteristic of said first and second hot wire anemometers is nonlinear, said first and second flow rate signals will remain comparable during operation over a wide range of flow rates without introducing unacceptable error; and a valve positioned in said second conduit and adjustably controlling the flow rate of said second gas when in a gaseous state in response to said control signal to maintain said predetermined ratio, whereby the flow rate of said second gas is controlled responsive to variations in the flow rate of said first gas to maintain the mass flow rates of said first and second gases in the desired ratio.

2. A method for controlling the relative mass flow rates of two gases, comprising:

providing a first conduit for the flow of a first gas comprising air, the flow being variable over a range of mass flow rates;

providing a first hot wire anemometer operating at a substantially constant temperature without appreciably altering the temperature of said first gas, said first hot wire anemometer being positioned to directly sense the mass flow rate of said first gas in said first conduit;

sensing the mass flow rate of said first gas in said first conduit with said first hot wire anemometer and generating a first flow rate signal indicating the mass flow rate of said first gas;

providing a second conduit for the flow of a second gas comprising a combustible gaseous fuel, the flow being adjustable over a range of mass flow rates;

providing a second hot wire anemometer operating at a substantially constant temperature without appreciably altering the temperature of said second gas, said second hot wire anemometer being positioned to directly sense the mass flow rate of said second gas in said second conduit, said first and second hot wire anemometers having a substantially identical nonlinear output characteristic relative to the mass flow being sensed;

sensing the mass flow rate of said second gas in said second conduit with said second hot wire anemometer and generating a second flow rate signal indicating the mass flow rate of said second gas;

selecting a predetermined ratio for the mass flow rates of said first and second gases;

providing said first and second conduits with interior flow cross-sectional areas sized relative to each other to correspond approximately to said predetermined ratio of the mass flow rates of said first and second gases, whereby the output characteristic of said first and second hot wire anemometers will be generally scaled by the choice of cross-sectional areas for said first and second conduits such that both said first and second hot wire anemometers operate in substantially the same region of their nonlinear output characteristic curves, and even though the output characteristic of said first and second hot wire anemometers are nonlinear, said first and second flow rate signals will remain comparable during operation over a wide range of flow rates without introducing unacceptable error;

comparing said first and second flow rate signals, and generating a control signal if said first and second flow rate signals vary indicating variation in mass flow rates from said predetermined ratio;

providing a valve positioned in said second conduit and adjustable for controlling the flow rate of said second gas; and controlling said valve in response to said control signal to maintain said predetermined ratio of mass flow rates, whereby the flow rate of said second gas is controlled responsive to variations in the flow rate of said first gas to maintain the mass flow rates of said first and second gases in the desired ratio.

* * * * *